May 12, 1970 N. L. FUQUA 3,511,413

VENDING MACHINE MIXING TRAY VENTILATION

Filed April 5, 1968

WITNESSES
Theodore F. Wrobel
James F. Young

INVENTOR
Norman L. Fuqua
BY
Grainey & Blake
ATTORNEY

United States Patent Office 3,511,413
Patented May 12, 1970

3,511,413
VENDING MACHINE MIXING TRAY
VENTILATION
Norman L. Fuqua, Wilbraham, Mass., assignor to
Westinghouse Electric Corporation, Pittsburgh,
Pa., a corporation of Pennsylvania
Filed Apr. 5, 1968, Ser. No. 719,146
Int. Cl. B67d 5/56
U.S. Cl. 222—129.1                                2 Claims

ABSTRACT OF THE DISCLOSURE

A ventilation arrangement for the mixing tray of a beverage dispensing machine wherein powdered foods are mixed with vaporous liquids and including a cover for the tray with a top wall and depending end and sidewalls together with spaced apart powder conveying spouts extending through the top wall and with the depending end walls of the cover engaging the tray end walls. The adjacent sidewalls of the tray and cover are formed to provide an elongated ventilation opening along the length of the tray on one side and a plurality of spaced apart ventilation openings on the other side at points intermediate the depending spouts of the cover so as to minimize flow of vapors upwards through the spouts when ventilating gas currents are induced across the mixing tray through the ventilation openings.

Cross references to related applications

So far as is known, this invention is not related to any pending patent applications.

Background of the invention

Coin controlled vending machines for vending hot beverages such as coffee, soup and the like are well known. Such machines must provide for the mixing of powdered foods with a hot vaporous liquid. For example, powdered cream and/or powdered sugar may be added to hot coffee as it is being dispensed and the vending machine is usually provided with a mixing tray for such purposes. It has long been known to provide some form of ventilation for the mixing tray to prevent the moist vapors from the hot liquid in the tray from contacting and caking the powdered food in the powder dispensing containers and dispensing outlets or spouts in a manner to interfere with the delivery of the requisite amounts of powdered foods to the mixing tray. Problems still exist in providing adequate ventilation and it is the purpose of this invention to provide an improved ventilating arrangement for a mixing tray of a hot beverage vending machine.

Prior art

Reference may be made to the United States Pat. No. 3,268,118 to Kopera issued Aug. 23, 1966, and classified in class 222 dispensing sub-class 129.1 which discloses a vending machine mixing tray with a ventilation arrangement of which the present invention is an improvement.

Summary of the invention

According to the present invention, a mixing tray is provided with a cover having a plurality of spaced apart spouts extending through its top wall into which powdered foods from a plurality of powdered food containers may be selectively dispensed downwardly into the tray. The cover is provided with downwardly extending end walls mating with adjacent end walls of the mixing tray. A first downwardly extending sidewall of the cover and the adjacent sidewall of the tray are formed to provide a first elongated ventilation opening extending along the length of the tray. The remaining downwardly extending sidewall of the cover and the adjacent sidewall of the tray are formed to provide a plurality of spaced apart ventilation openings positioned at points intermediate the positions of the depending spaced apart cover spouts. A suitable manifold and fan is provided for inducing currents of ventilating gas such as air through the ventilation openings and the positions of the plurality of spaced apart ventilation openings relative to the positions of the depending spouts are such as to cause the ventilating air currents across the tray to flow in such manner as to minimize the flow of hot vapors upwardly through the spouts and also minimize the undesired suction or induction of powdered foods through the ventilating openings into the manifold.

Further objects and features of the attending advantages of the invention will be apparent with reference to the following specification and drawing.

Description of the preferred embodiment

Figure 1:
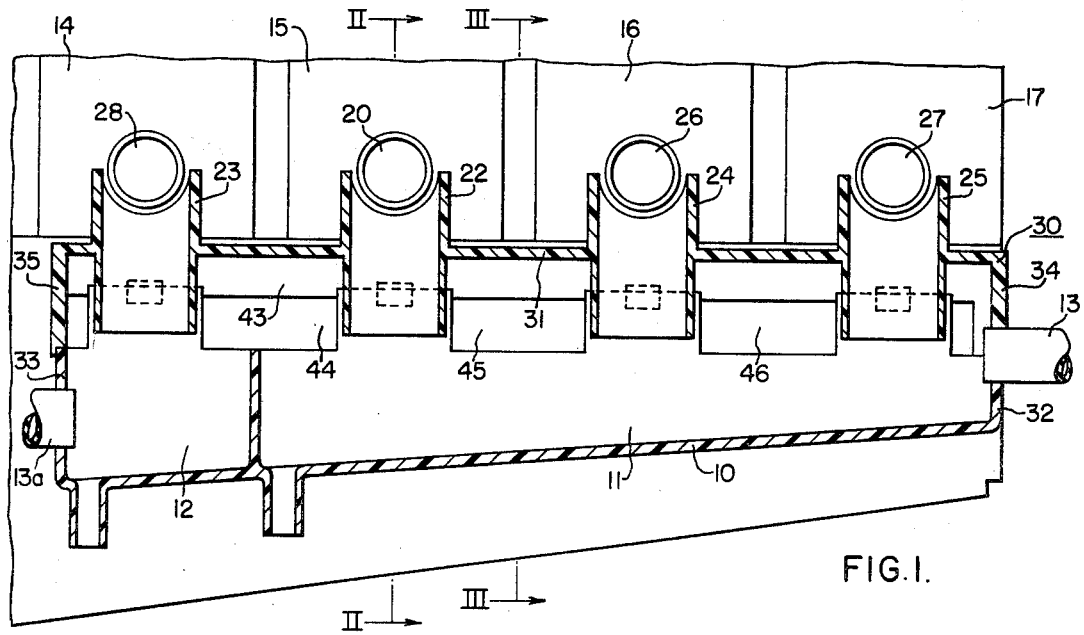
FIG. 1 is a fragmentary side view partly in section of the mixing tray, and ventilation cover of the invention also showing a number of powdered food containers and dispensing outlets therefor.

Referring to the drawing, the mixing tray of the invention is generally shown at 10 to be subdivided into a first mixing compartment 11 and a second mixing compartment 12. A hot vaporous liquid such as freshly brewed coffee may be introduced into the compartment 11 of the mixing tray 10 through the conduit 13 while a similar conduit 13a is provided for introducing hot liquid into the compartment 12. Alternatively, hot water may be introduced through the conduit 13 for mixture with a powdered food such as tea in order to dispense tea from the tray compartment 11. The tray compartment 12 may be used for mixing hot water supplied through conduit 13a with a powdered food such as chicken soup powder or the like for vending a hot soup or broth. As will be seen from the following description, the invention is not limited to its use with a compartmented mixing tray having the compartments 11 and 12 but may be used with any form of mixing tray in which a hot vaporous liquid is to be mixed with a substance such as powdered food.

Figure 2:
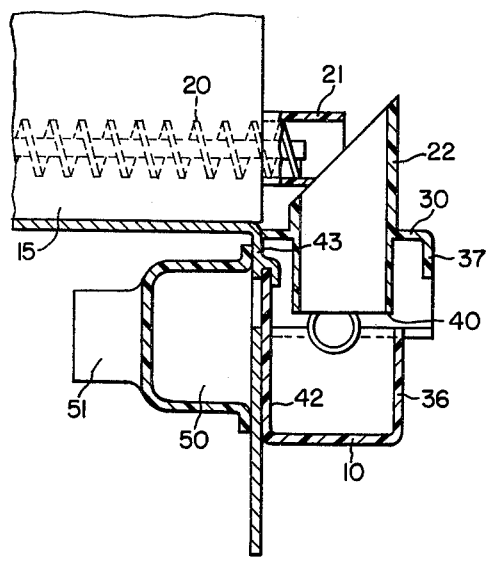
FIG. 2 is a fragmentary cross-section taken on the line II—II of FIG. 1.
Figure 3:
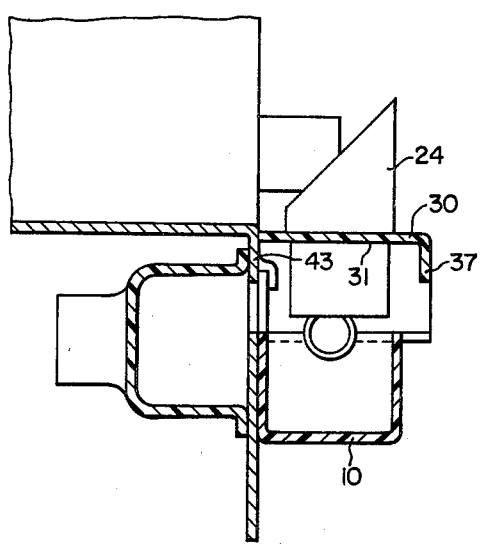
FIG. 3 is a fragmentary cross-section taken on the line III—III of FIG. 1.

Positioned above the mixing tray 10 are a plurality of powdered food containers partially shown at 14, 15, 16 and 17 each adapted to contain a different powdered food such as powdered soup, powdered sugar, powdered tea or powdered cream. As more clearly shown by FIG. 2 of the drawing, the bottom of each powdered food container such as the container 15 is provided with a feed screw mechanism 20 which when rotated by any suitable means (not shown) will function as an auger to feed powdered food through a hopper dispensing outlet such as the outlet 21 into a respective spout such as the spout 22 to be dropped downwardly into the mixing tray 10. It will be noted that the mixing tray 10 is provided with a cover 30 having a top wall 31 through which each of the plurality of dispensing spouts 22–25 extend in vertically spaced apart positions. Thus the auger 20 of the powdered food container 15 is adapted to feed powdered food through the spout 22 into the mixing tray compartment 11 while similarly, the auger 26 for the container 16, the auger 27 for the container 17 and the auger 28 for the container 14 are adapted to feed powdered foods through their respective spouts 24, 25 and 23 of the mixing tray cover 30.

It will be noted that the mixing tray 10 is provided with end walls 32 and 33 mating with respective depending end walls 34 and 35 of the cover 30. One sidewall 36 of the mixing tray 10 which is adjacent to the depending sidewall 37 of the cover 30 is shaped to conform with the shape of the depending sidewall 37 in such manner as to provide an elongated ventilation opening along one side of the mixing tray. It should be noted that the depending end of each food spout such as the spout 22 is positioned as shown at 40 to be somewhat lower than the end of the depending sidewall 37 of the cover 30, so that in effect the discharge end of each spout is positioned intermediate the upper and lower edges of the longitudinal ventilation opening formed between the sidewalls 36 and 37.

The remaining sidewall 42 of the tray 10 and the adjacent depending sidewall 43 of the cover are shaped to provide a plurality of spaced apart ventilation openings such as shown at 44, 45 and 46 to be located at positions intermediate the spaced apart positions of the powder discharge spouts 22–25. Positioned to the rear of the sidewalls 43 and 42 in any suitable manner is a manifold 50 which may be connected by the conduit coupling 51 to a flexible tube leading to a suction and exhaust fan, not shown.

Considering the functioning of the invention as thus described when a suction is applied to the manifold 50 a current of ventilating gas such as the air within the vending machine will be drawn through the elongated ventilation opening between the tray side 36 and the depending cover side 37 across the interior of the tray and outward through the ventilation openings 44–46 to draw off any vapors from hot liquids contained in the tray and prevent or minimize the movement of liquid vapor upward into any of the powder dispensing spouts 23–25. Since the spaced apart ventilation openings 44–46 are located at points intermediate the positions of the depending spouts 22–25, the currents of ventilation air or gas within the mixing tray are diverted away from the ends of the powder discharging spouts 22–25 and the undesirable effects of the air carrying the powder into the manifold 50 are minimized. The air velocity through the spouts 22–25 is just sufficient to conduct the powder down, prevent vapors from rising, and insufficient to carry powder through the ventilation openings. In view of the specified arrangement for the location of the plurality of spaced apart ventilation openings it is possible to form the top wall 31 of the cover 30 as a simple, flat wall extending in a plane generally parallel transversely to the transverse plane of the bottom wall 10 of the mixing tray. It is also possible to shorten the spouts to thus position the lower end of each powder spout at a point somewhat intermediate the edges of the sidewalls 36 and 37, without inducing undesirable suction or draft effects in the spouts by the flow of ventilation gas across the mixing tray.

While the manifold 50 is shown to be fastened to the sidewalls 42 and 43 in such manner as to exhaust ventilation air from the openings 44–46 it should be obvious that the invention may be modified to provide for other arrangements of inducing a flow of ventilation air through the described ventilating openings. For example a manifold may be provided on the opposite side of the mixing tray for drawing air in the opposite direction across the mixing tray from the spaced ventilation openings 44–46 through the elongated opening between the adjacent sidewalls 36 and 37. Various other modifications will occur to those skilled in the art.

I claim as my invention:

1. Apparatus for dispensing hot beverages, said apparatus including a plurality of receptacles adapted to contain powdered food and each having a powder dispensing outlet, a tray having bottom, end and sidewalls within which beverages are prepared by mixing with a vaporous liquid therein one or more of the powders from said receptacles, a cover having a top wall extending over said tray along its length with end walls depending into engagement with the end walls of the tray, a plurality of spaced apart spouts extending through the top wall of the cover from respective points adjacent a respective receptacle outlet depending to points below the cover through which respective powders may be dispensed into the tray, means to introduce a vaporous liquid into said tray, a first depending sidewall of the cover and the adjacent sidewall of the tray being shaped to provide a first ventilation opening extending along the length of the tray, a second depending sidewall of the cover and the adjacent sidewall of the tray being shaped to provide a plurality of second ventilation openings at spaced points intermediate the depending positions of said spouts, the lower ends of each of said spouts being intermediate the depending lower opening edge of the first sidewall of the cover and the opening edge of the adjacent sidewall of the tray, and means to induce a current of ventilating gas from said first opening to said second ventilation openings in a manner to exhaust liquid vapors from the tray with diverging vapor flows around said spouts.

2. The invention of claim 1 in which the transverse plane of the top wall of the cover is parallel to the transverse plane of the bottom wall of said tray.

References Cited

UNITED STATES PATENTS

| | | | |
|---|---|---|---|
| 2,614,738 | 10/1952 | Mills | 222—129.3 X |
| 2,843,293 | 7/1958 | Burgoyne | 222—129.4 |
| 2,939,614 | 6/1960 | Hill | 222—190 |
| 3,268,119 | 8/1966 | Kopera | 222—129.1 |

SAMUEL F. COLEMAN, Primary Examiner